(12) United States Patent
Iesato et al.

(10) Patent No.: US 10,365,174 B2
(45) Date of Patent: Jul. 30, 2019

(54) LOAD DETECTION APPARATUS HAVING A STRAIN DETECTION ELEMENT ATTACHED TO A CONNECTION PORTION OPPOSITE THE CIRCUIT BOARD

(71) Applicant: AISIN SEIKI KABUSHIKI KAISHA, Kariya-shi (JP)

(72) Inventors: Naoya Iesato, Kariya (JP); Yasukuni Ojima, Kariya (JP); Kenichi Taguchi, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 17 days.

(21) Appl. No.: 15/548,030

(22) PCT Filed: Feb. 24, 2016

(86) PCT No.: PCT/JP2016/055492
§ 371 (c)(1),
(2) Date: Aug. 1, 2017

(87) PCT Pub. No.: WO2016/140127
PCT Pub. Date: Sep. 9, 2016

(65) Prior Publication Data
US 2018/0017451 A1 Jan. 18, 2018

(30) Foreign Application Priority Data

Mar. 4, 2015 (JP) ................................. 2015-042576

(51) Int. Cl.
*G01L 1/22* (2006.01)
*F16D 65/18* (2006.01)
(Continued)

(52) U.S. Cl.
CPC ............. *G01L 1/2287* (2013.01); *B60T 8/171* (2013.01); *B60T 17/221* (2013.01); *F16D 65/18* (2013.01);
(Continued)

(58) Field of Classification Search
CPC .. F16D 65/18; F16D 2121/24; F16D 2125/40; B60T 13/741; G01L 1/22;
(Continued)

(56) References Cited

U.S. PATENT DOCUMENTS 4,662,483 A * 5/1987 Boeck .................. F16D 55/226
188/72.3
5,485,222 A 1/1996 Wischermann
(Continued)

FOREIGN PATENT DOCUMENTS

JP 2014-101960 A 6/2014

OTHER PUBLICATIONS

International Search Report dated Mar. 22, 2016 in PCT/JP2016/055492 filed Feb. 24, 2016.

*Primary Examiner* — Harshad R Patel
*Assistant Examiner* — Brandi N Hopkins
(74) *Attorney, Agent, or Firm* — Oblon, McClelland, Maier & Neustadt, L.L.P.

(57) ABSTRACT

A load detection apparatus includes an input member for receiving input of a load, a tubular body having a strain element configured to generate a strain due to the load inputted to the input member, a strain detection element fixed to a face of the strain element opposite its face that comes into contact with the input member, the strain detection element being configured to detect the strain generated in the strain element, a circuit board mounted to oppose the strain detection element in a tube axis direction of the tubular body, the circuit board being configured to input (Continued)

detection information of the strain detection element, and a connection member having a first connection portion to be electrically connected to the strain detection element and a second connection portion to be electrically connected to the circuit board.

4 Claims, 8 Drawing Sheets

(51) Int. Cl.
  *B60T 8/171* (2006.01)
  *G01L 5/22* (2006.01)
  *B60T 17/22* (2006.01)
  *F16D 66/00* (2006.01)
(52) U.S. Cl.
  CPC .................. *G01L 1/22* (2013.01); *G01L 5/22* (2013.01); *F16D 66/00* (2013.01); *F16D 2066/005* (2013.01)

(58) Field of Classification Search
  CPC ..... G01L 5/223; G01L 9/0051; G01L 9/0044; G01L 1/2231; G01L 9/0055; G01L 5/161
  See application file for complete search history.

(56) References Cited

U.S. PATENT DOCUMENTS

| | | | |
|---|---|---|---|
| 7,040,463 B2 * | 5/2006 | Baumann | F16D 65/18 188/156 |
| 2004/0083825 A1 * | 5/2004 | Tsutaya | G01G 3/14 73/862.474 |
| 2015/0068324 A1 * | 3/2015 | Ojima | G01L 1/22 73/862.045 |
| 2015/0276514 A1 * | 10/2015 | Shibata | G01L 1/22 73/862.045 |
| 2015/0300433 A1 | 10/2015 | Yasui et al. | |

* cited by examiner

LOAD DETECTION APPARATUS HAVING A STRAIN DETECTION ELEMENT ATTACHED TO A CONNECTION PORTION OPPOSITE THE CIRCUIT BOARD

TECHNICAL FIELD

This disclosure relates to a load detection apparatus configured to detect a load generated from various devices mounted on a vehicle for instance.

RELATED ART

Patent Document 1 discloses a conventional load detection apparatus configured to detect a pressing force applied to a brake disc for vehicle braking as a load.

This load detection apparatus includes an input member for receiving input of a load, a tubular body having a strain element (flexure element) configured to generate a strain due to the load inputted to the input member, a strain detection element for detecting the strain generated in the strain element, a circuit board configured to input detection information of the strain detection element, and a connection member having a first connection portion to be electrically connected to the strain detection element and a second connection portion to be electrically connected to the circuit board.

The strain detection element is fixed to a face of the strain element opposite its face that comes into contact with the input member. The circuit board is mounted to oppose the strain detection element in a tube axis direction (direction along the tube axis) of the tubular body. An attaching portion of the strain detection element to be attached to the first connection portion is provided to oppose the circuit board. The strain detection element, the connection member and the circuit board are disposed in this mentioned order along the tube axis direction and assembled to the inner side of the tubular body.

PRIOR-ART DOCUMENT

Patent Document

Patent Document 1: Japanese Unexamined Patent Application Publication No. 2014-101960

SUMMARY

Problem to be Solved by Invention

In the load detection apparatus disclosed in Patent Document 1, the attaching portion of the strain detection element to be attached to the first connection portion is provided to oppose the circuit board. With this arrangement, after the connection member is assembled to the tubular body to which the strain detection element has already been assembled, the first connection portion of this connection member can be connected to the attaching portion of the strain detection element.

However, the attaching portion of the circuit board to be attached to the second connection portion is provided in the face of the circuit board facing the first connection portion. Thus, if the circuit board is assembled to the tubular body to which the connection member has already been assembled, the attaching portion of this circuit board can no longer be connected to the second connection portion.

For this reason, it is necessary to electrically connect the strain detection element and the circuit board via the connection member in advance and then to assemble these connected strain detection element and the circuit board to the tubular body. Hence, the assembly operation tends to be complicated.

The present invention has been made in view of the above-described state of the art and its object is to provide a load detection apparatus which can be assembled easily.

Solution

According to a characterizing feature of a load detection apparatus relating to this disclosure, the load detection apparatus comprises:

an input member for receiving input of a load;

a tubular body having a strain element configured to generate a strain due to the load inputted to the input member;

a strain detection element fixed to a face of the strain element, the face being opposite to another face of the strain element, said another face coming into contact with the input member, the strain detection element being configured to detect the strain generated in the strain element;

a circuit board mounted to oppose the strain detection element in a tube axis direction of the tubular body, the circuit board being configured to receive input of detection information of the strain detection element;

a connection member having a first connection portion to be electrically connected to the strain detection element and a second connection portion to be electrically connected to the circuit board;

an attaching portion of the strain detection element to be attached to the first connection portion being provided to oppose the circuit board; and an attaching portion of the circuit board to be attached to the second connection portion being provided in a face of the circuit board opposite a further face of the circuit board which faces the first connection portion.

In the case of the load detection apparatus having the above-described configuration, an attaching portion of the strain detection element to be attached to the first connection portion is provided to oppose the circuit board in the tube axis direction; and also an attaching portion of the circuit board to be attached to the second connection portion is provided in a face of the circuit board opposite a further face of the circuit board which faces the first connection portion.

Therefore, even if the circuit board is assembled to the tubular body to which the connection member has already been assembled, the second connection portion of the connection member can still be connected to the attaching portion of this circuit board.

Consequently, when the connection member is to be assembled to the tubular body to which the strain detection element has already been assembled, the first connection portion can be connected to the attaching portion of the strain detection element. Further, when the circuit board is to be assembled to the tubular body to which the connection member has already been assembled, the attaching portion of the circuit board can be connected to the second connection portion.

Accordingly, with the load detection apparatus having the above-described configuration, without need to electrically connect the stain detection element and the circuit board each other via the connection member in advance, the configuration yet allows establishment of such electrical connection between the strain detection element and the circuit member via the connection member, while allowing simultaneously assembly of the strain detection element and the connection member respectively to the circuit board or while allowing simultaneously assembly of the connection member and the circuit board connected to each other to the strain detection element respectively.

In this way, with the load detection apparatus having the above-described configuration, the assembly operation between the connection member and the circuit board is simplified and the assembly is facilitated.

According to a further characterizing feature of the present invention, the connection member is formed of a flexible material and is disposed to circumvent an edge of the circuit board.

With the above arrangement, it is possible to dispose the first connection portion and the second connection portion at respective positions distant from each other across the circuit board therebetween. Thus, displacement that occurs in the first connection portion connected to the strain detection element in association with deformation in the strain element will hardly be transmitted to the second connection portion. Consequently, reduction in the strength of the connecting portion between the second connection portion and the circuit board due to material fatigue or flexure of the connecting portion between the second connection portion and the circuit board will occur less likely. Thus, the durability of the load detection apparatus can be enhanced and high detection precision can be maintained for a long period of time.

According to a further characterizing feature of the present invention, between the strain element and the circuit board, there is provided a fixation member to which the circuit board is fixed; and the fixation member is supported to the tubular body via an elastic member.

With the above-described arrangement, vibration occurring in the tubular body can be damped by the elastic member, thus preventing transmission of the vibration to the circuit board via the fixation member. Thus, the strength reduction in the connecting portion between the second connection portion and the circuit board will occur even less likely. Consequently, the durability of the load detection apparatus can be further enhanced and high detection precision can be maintained for an even longer period of time.

According to a further characterizing feature of the present invention, the elastic member is disposed between the strain element and the fixation member; and a reaction-force receiving portion of the elastic member is provided in the tubular body.

With the above arrangement, the elastic member is disposed, via its reaction-force receiving portion, between the strain element and the fixation member. Thus, it is possible to prevent the fixation member from interfering with the strain detection element or the first connection portion.

According to a further characterizing feature of the present invention, the reaction-force receiving portion is provided in a cantilever manner from an inner circumferential portion of the tubular body toward the tube axis.

With the above-described arrangement of the reaction-force receiving portion being provided in a cantilever manner from an inner circumferential portion of the tubular body, the reaction-force receiving portion can be formed without adversely affecting the shape of the strain element. Therefore, the elastic member and/or the fixation member will not interfere with a strain generating portion of the strain element and the extending length of the strain generating portion of the strain element from the inner circumferential portion to the tube axis can be retained long. As a result, a large strain will occur at the strain element, thus enhancing the detection precision of the load.

EMBODIMENTS

Next, embodiments of the present invention will be explained with reference to the drawings.

FIGS. 1 through 13 show a load detection apparatus according to this embodiment, which is configured to detect a pressing force applied to a brake disc for vehicle braking for instance as a load F.

Figure 1:
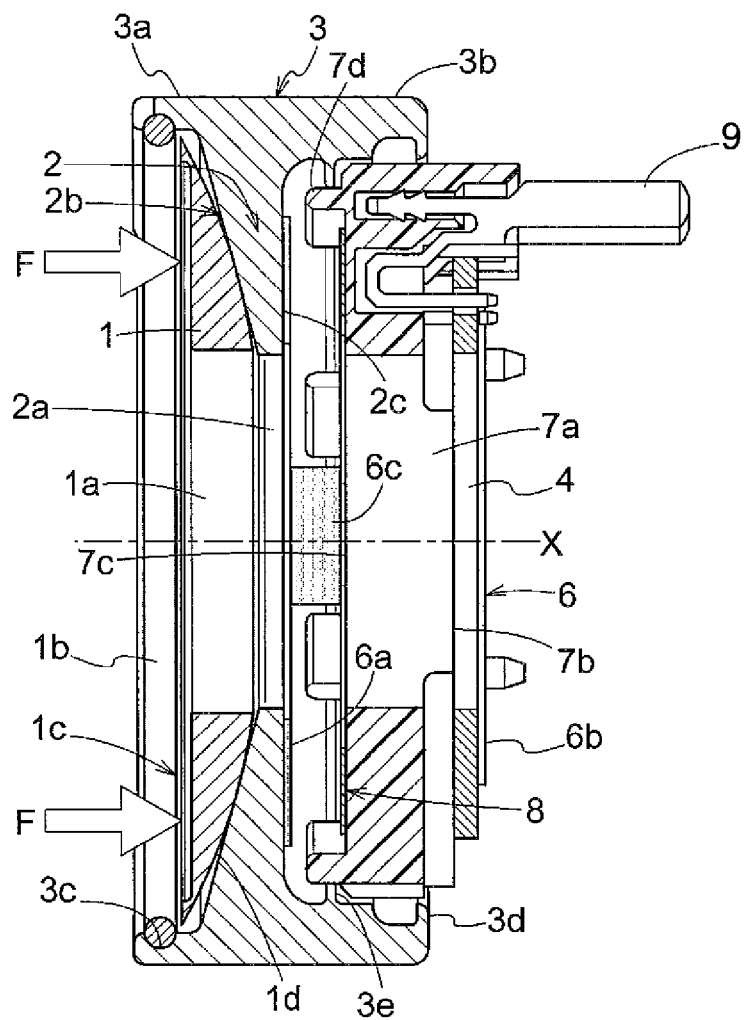
[FIG. 1] is a section view of a load detection apparatus taken along a tube axis.
Figure 2:
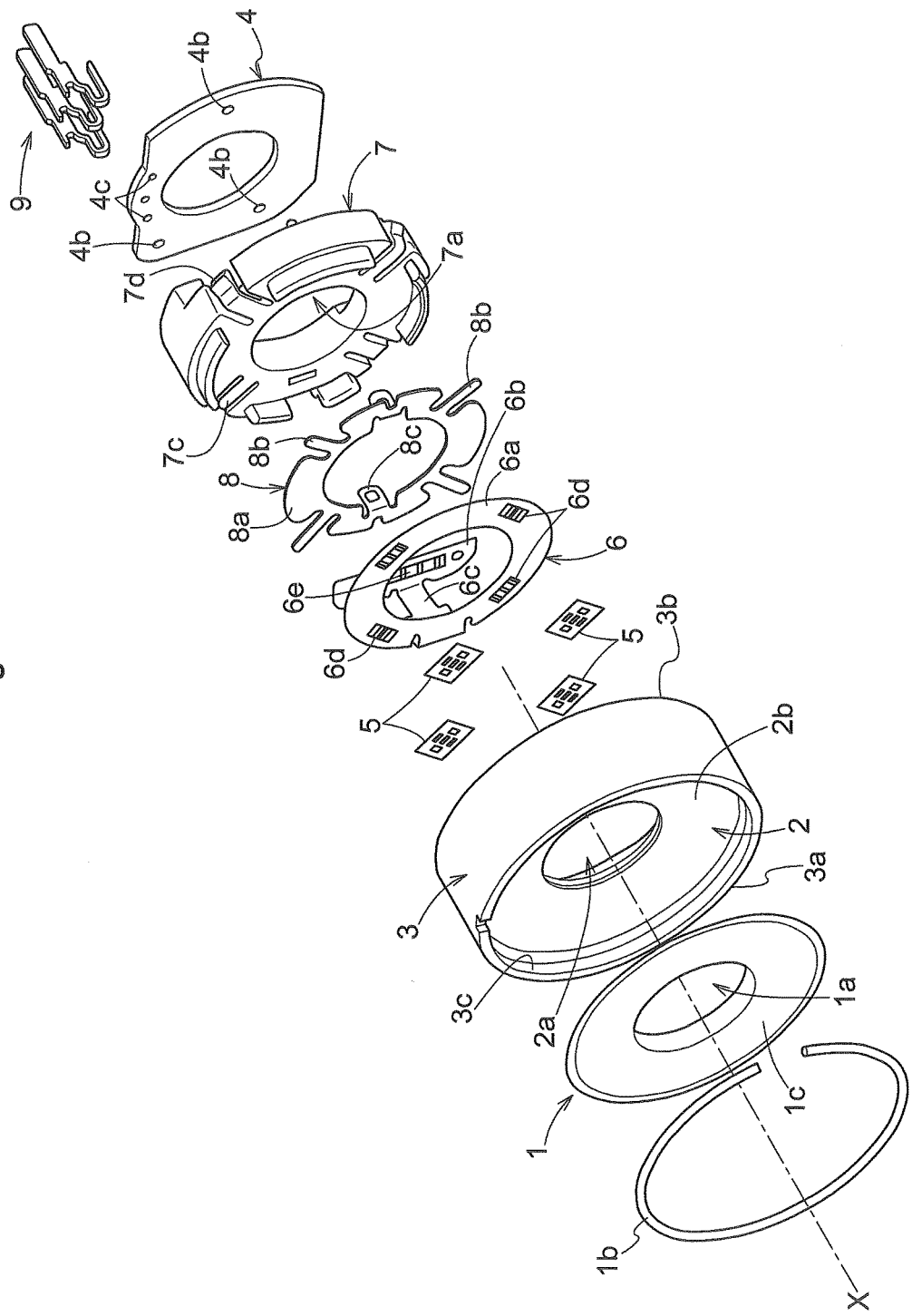
[FIG. 2] is an exploded perspective view of the load detection apparatus.

As shown in FIG. 1 and FIG. 2, the load detection apparatus includes an input member 1 to which the load F to be detected is inputted and a cylindrical tubular body 3.

On the inner circumferential side of the tubular body 3, there is integrally provided a round annular-shaped strain element 2 configured to generate a strain due to the load F inputted to the input member 1.

The strain element 2 and the tubular body 3 are formed integrally with each other of e.g. stainless steel, so that deformation in the outer circumferential portion of the strain element 2 can be restricted by the tubular body 3.

The tubular body 3 is configured such that the strain element 2 extends toward opposed sides across a direction along a tube axis X (this will be referred to as "tube axis direction" hereinafter) and the tubular body 3 integrally includes a first tubular body portion 3a extending on the side of the input member 1 and a second tubular body portion 3b extending toward the side of a circuit board 4, with the first tubular body portion 3a and the second tubular body portion 3b having a same outside diameter.

The input member 1 has a shape which is formed by cutting a sphere by a flat cutting face at a portion distant from the center of the sphere and its inner circumferential face forms a cylindrical through hole 1a centering about a segment extending through the sphere center.

The input member 1 is accommodated on the inner side of the first tubular body portion 3a under a posture with the center axis of the through hole 1a being coaxial with the tube axis X.

On the inner side of the first tubular body portion 3a, there is fitted a C-shaped stopper ring 1b for preventing inadvertent withdrawal of the input member 1 from the first tubular body portion 3a.

This stopper ring 1b is engaged in a circumferential groove 3c defined in the inner circumferential face of the first tubular body portion 3a.

A flat face formed annular around the through hole 1a of the input member 1 constitutes an input face 1c to which the load F is to be inputted.

A spherical face portion formed annular as the face of the input member 1 opposite its face defining the input face 1c constitutes an output face 1d for transmitting the inputted load F to the strain element 2.

The inner circumferential face of the strain element 2 has an annular shape having a cylindrical through hole 2a coaxial with the tube axis X and includes, on the front and rear asides thereof in the tube axis direction, a round annular contact face 2b to which the output face 1d of the input member 1 comes into contact and a round annular-shaped strain detection face 2c.

The contact face 2b has a conical face shape which extends closer to the strain detection face 2c as it approaches the tube axis X; and as the output face 1d of the input member 1 comes into annular line contact with the contact face 2b, the load F is transmitted to the strain element 2.

In the face of the strain element 2 opposite to the contact face 2b thereof which comes into contact with the input member 1, there is formed the flat strain detection face 2c along a direction perpendicular to the tube axis X. To this strain detection face 2c, there are fixedly bonded a plurality (four in the case of this embodiment) of strain detection elements (strain gauges) 5 for detecting strain that occurs in the strain element 2.

The strain detection elements 5 can detect the strain that occurred in the strain detection face 2c according to a magnitude of the load F transmitted thereto.

On the inner side of the second tubular body portion 3b, there are assembled a circuit board 4 for signal processing, configured to receive input of detection information from the strain detection elements 5, a connection member 6 for electrically connecting the strain detection elements 5 and the circuit board 4 to each other, a fixation member (a board holder) 7 to which the circuit board 4 is fixed, an elastic member 8 for elastically supporting the fixation member 7 to the tubular body 3, and three output terminals (terminals) 9 for signal transmission between the circuit board 4 and a control section (not shown).

The connection member 6 is provided in the form of a flat plate formed of a soft flexible material and includes, in series, a round annular first connection portion 6a to be electrically connected to the strain detection elements 5 by means of soldering, a flat plate-like second connection portion 6b to be electrically connected to the circuit board 4 by means of soldering, and a band-plate like third connection portion 6c electrically connecting the first connection portion 6a and the second connection portion 6b to each other.

In the connection member 6 prior to its assembly to the tubular body 3, the first connection portion 6a, the second connection portion 6b and the third connection portion 6c are formed as a continuous series of flat shapes. At the time of assembly to the tubular body 3, the connection member 6 will be bent along a border between the first connection portion 6a and the third connection portion 6c and a border between the third connection portion 6c and the second connection portion 6b one after another eventually into a U-shape and assembled in this shape to the tubular body 3.

A lead portion 5a (see FIG. 7) as an attaching portion of the strain detection elements 5 to the first connection portion 6a is provided in such a manner to oppose the circuit board 4 across the connection member 6 and the fixation member 7.

The first connection portion 6a defines, at four circumferentially spaced portions thereof, first through holes 6d through which the lead portion 5a is exposed when the first connection portion 6a is overlapped with the strain detection elements 5 along the tube axis direction from the opening side of the second tubular body portion 3b.

The first connection portion 6a is soldered to the lead portion 5a through the first through holes 6d.

A signal input portion 4a (see FIG. 9, FIG. 10) as an attaching portion of the circuit board 4 to the second connection portion 6b is provided in the face of the circuit board 4 opposite to its face facing the first connection portion 6a, namely, the face facing to the outside of the second tubular body portion 3b in the tube axis direction.

The second connection portion 6b includes a second through hole 6e through which the signal input portion 4a is exposed when the second connection portion 6b is overlapped with the circuit board 4 along the tube axis direction from the opening side of the second tubular body portion 3b.

The second connection portion 6b is soldered to the signal input portion 4a through the second through hole 6e.

The third connection portion 6c is provided in such a manner to circumvent the edges of the fixation member 7 and the circuit board 4 which face the inner circumferential face of the second tubular body portion 3b.

The circuit board 4 includes a detection circuit (not shown) for detecting a magnitude of load based on detection information from the strain detection elements 5 and the circuit board 4 is disposed to face the stain detection elements 5 in the tube axis direction across the fixation member 7 and the connection member 6 therebetween.

The detection circuit includes a Wheatstone bridge circuit constituted by interconnection of the plurality of the strain detection elements 5.

In operation, the Wheatstone bridge circuit detects the load F by obtaining a change in the resistance value when a tensile force or a compression force is applied to the strain detection elements 5 through a corresponding change in voltage or current. Such strain detection elements 5 and Wheatstone bridge circuit are well-known in the art, thus detailed discussion thereof will be omitted herein.

The fixation member 7 is formed as an annular member formed of thermoplastic resin material and having a cylindrical through hole 7a. And, the fixation member 7 is assembled between the strain element 2 and the circuit board 4 under a posture of the center line of the through hole 7a being coaxial with the tube axis X.

The fixation member 7, as shown in FIGS. 3 through 9, includes a board fixing face 7b for fixing the circuit board 4 by caulking, an elastic member fixing face 7c for engaging and fixing the elastic member 8, a plurality of snap-fitting type engaging pawls 7d to be engaged with the inner circumferential side of the second tubular body portion 3b, and a projection portion 7e engageable with the inner circumferential side of the second tubular body portion 3b for fixing the position relative to the tubular body 3 about the tube axis.

On the board fixing face 7b, a plurality (three in this embodiment) of positioning pins 7f are provided to project therefrom for position-fixing the posture of the circuit board 4 about the tube axis.

Figure 8:
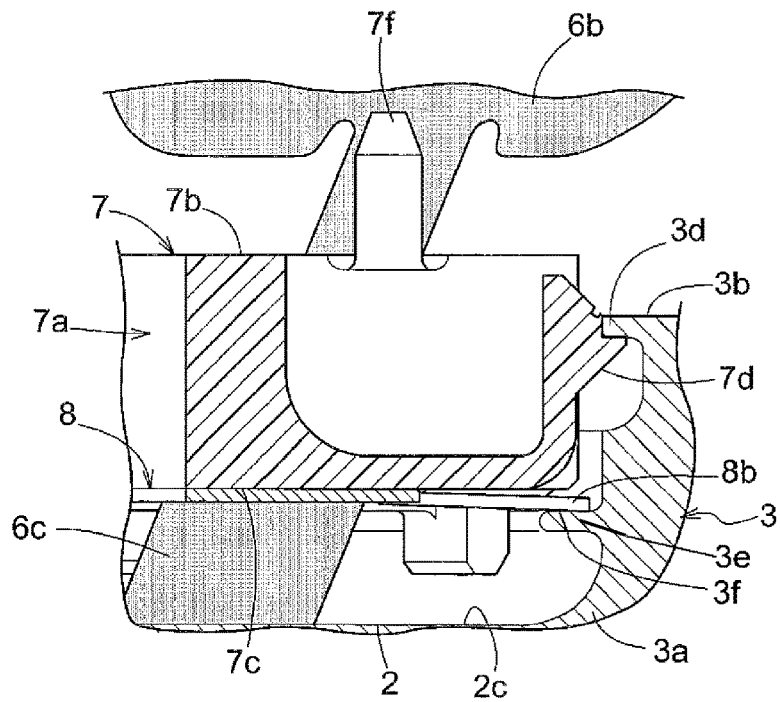
[FIG. 8] is a section view showing principal portions of the fixation member assembled to the tubular body.

The fixation member 7 is retained non-withdrawably to the inner side of the second tubular body portion 3b through the engagement of the engaging pawls 7d to a brim 3d formed at the opening portion of the second tubular body portion 3b (see FIG. 8).

The fixation member 7 includes the board fixing face 7b on one end side in the tube axis direction of this fixation member 7 and includes the elastic member fixing face 7c on the other end side in the tube axis direction of this fixation member 7, and includes also the plurality of engaging pawls 7d in the outer circumferential portion of this fixation member 7 equidistantly spaced apart from each other in the circumferential direction.

Figure 3:
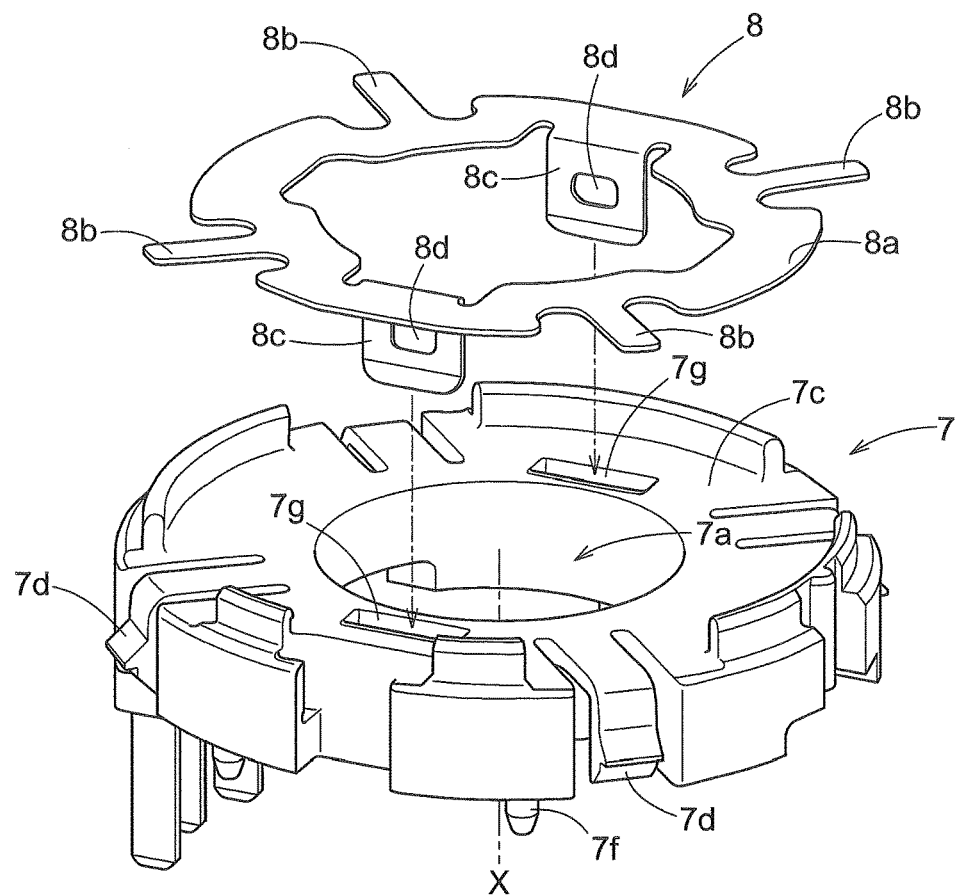
[FIG. 3] is a perspective view showing a fixation member as seen from an elastic member fixing face side.

The elastic member 8 is formed of a plate spring member and is disposed between the strain element 2 and the fixation member 7. The elastic member 8, as shown in FIG. 3, includes integrally a round circular flat main body plate portion 8a, a plurality (four in this embodiment) of support pieces 8b supported to the inner circumferential side of the tubular body 3, and a plurality (two in this embodiment) of retaining pieces 8c to be retained to the fixation member 7.

The support pieces 8b extend in the form of bands from the outer circumferential edge of the main body plate portion 8a toward the direction perpendicular to the tube axis X, and as shown in FIG. 8, are received and stopped by a reaction-force receiving portion 3e formed with this projecting end portion projecting from the inner circumferential portion of the second tubular body portion 3b toward the center direction. In this way, as the elastic member 8 is disposed between the stain element 2 and the fixation member 7 by the reaction-force receiving portion 3e, it is possible to prevent the fixation member 7 from interfering with the stain detection elements 5 and/or the first connection portion 6a.

The retaining pieces 8c extend integrally from the inner circumferential edge of the main body plate portion 8a under the posture parallel with the tube axis X and define retaining holes 8d therein. At positions in the fixation member 7 opposed to each other across the tube axis X, two elongate holes 7g are formed parallel with the tube axis X and inside these holes 7g, retaining pawls 7h project.

And, when the two retaining pieces 8c are pressed into the respective elongate holes 7g, the retaining pieces 8c will be elastically deformed in such a manner to ride over the retaining pawls 7h.

Figure 4:
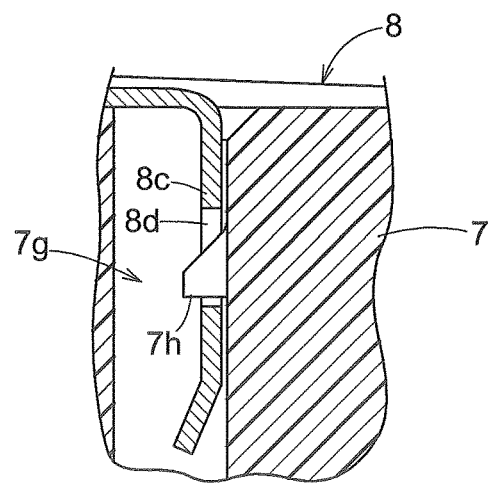
[FIG. 4] is a partial section showing a fixation arrangement of an elastic member.

With the above, the retaining pawls 7h enter the retaining holes 8d as shown in FIG. 4, and the elastic member 8 will be non-withdrawably fixed to the fixation member 7.

The elastic member 8 supports the fixation member 7 to the second tubular body portion 3b with allowing elastic deformation of the former in the tube axis direction, through elastic deformation of the supporting pieces 8b whose leading ends are received and stopped by the reaction-force receiving portion 3e.

The reaction-force receiving portion 3e is provided by extending a continuous annular brim 3f in the circumferential direction along the inner circumference of the second tubular body portion 3b in a cantilever manner toward the tube axis X.

With the above-described cantilever extension of the reaction-force receiving portion 3e, it is possible to secure a maximum projection length of the strain generating area of the strain element 2 from the inner circumference of the second tubular body portion 3b toward the tube axis X while effectively preventing interference with the strain generating area of the strain element 2 by the elastic member 8 or the fixation member 7 at the same time. With this, strain that occurs in the strain element 2 can be large, so that the detection precision of the load can be enhanced.

Incidentally, the shape of the reaction-force receiving portion 3e is not limited to the cantilever shape described above, but can be simple stepped projection from the inner circumference of the second tubular body portion 3b toward the tube axis X. With this arrangement, the strain generating area of the strain element 2 will be slightly smaller, but the structure of the reaction-force receiving portion 3e can be simplified.

Figure 5:
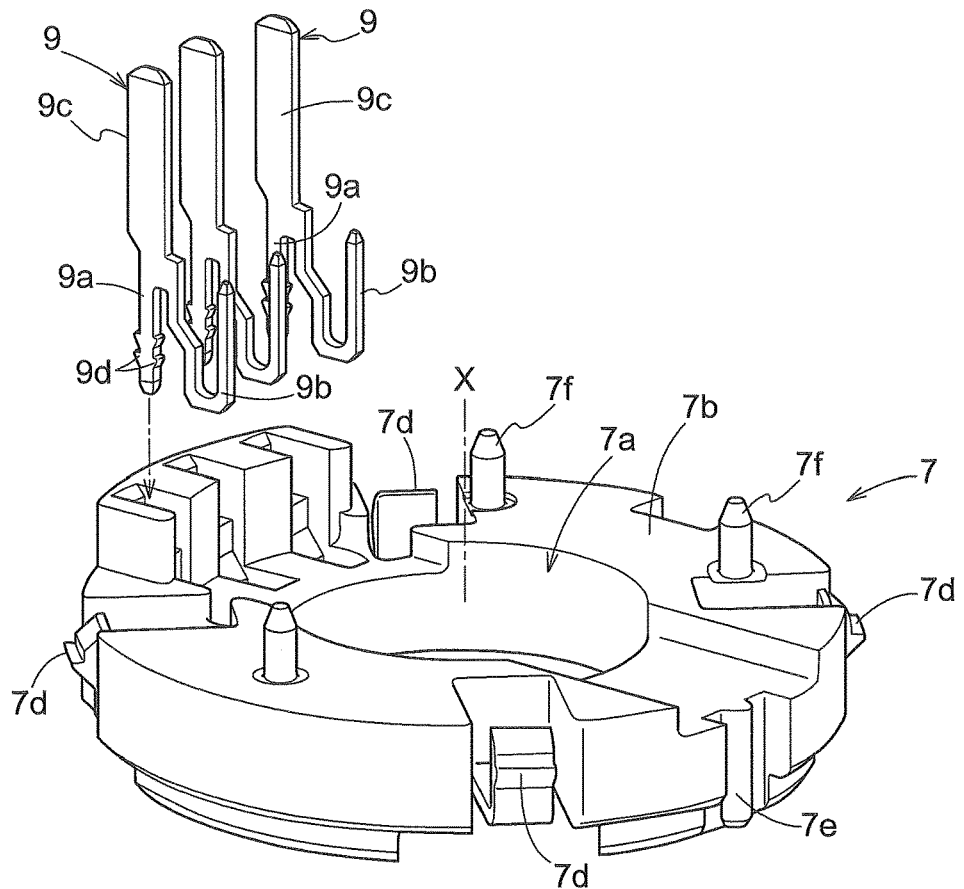
[FIG. 5] is a perspective view showing the fixation member as seen from a board fixing face side.

The output terminal 9 is fixed to the board fixing face 7b and is provided, as shown in FIG. 5, in the form of a plate in which a fixing shaft portion 9a having a rectangular cross section and configured to be fixed to the fixation member 7 and a connecting shaft portion 9b having a rectangular cross section and configured to be soldered to the circuit board 4 extend from a terminal body portion 9c.

The fixing shaft portion 9a integrally includes sawtooth-like stopper projections 9d on the opposed sides of the plate width direction.

The connecting shaft portion 9b has a U-shape as seen in a side view and its leading end portion is to be soldered to the circuit board 4.

Figure 6:
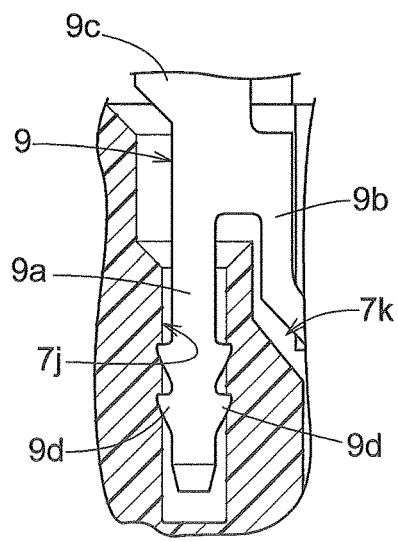
[FIG. 6] is a partial section showing a fixation arrangement of an output terminal.

As shown in FIG. 6, in the fixation member 7, there are formed a press-in hole 7j into which the fixing shaft portion 9a is be pressed and a press-in groove 7k into which the connecting shaft portion 9b is to be pressed.

The press-in hole 7j and the press-in groove 7k are opened to the board fixing face 7b and sizes thereof for respectively clamping the fixing shaft portion 9a and the connecting shaft portion 9b in the plate thickness direction are narrower than the plate thickness.

With the above arrangement, the fixing shaft portion 9a pressed into the press-in hole 7j and the connecting shaft portion 9b pressed into the press-in groove 7k will be firmly clamped in the plate thickness direction, so that no looseness will occur over a long period of time.

Further, the press-in hole 7j has a narrower width than the plate width of the fixing shaft portion 9a.

With the above arrangement, the fixing shaft portion 9a will be pressed into the press-in hole 7j while spreading the hole width with the stopper projections 9d, and as the stopper projections 9d bite into the fixation member 7, the stopper function can be provided without looseness for an extended period of time.

The connecting shaft portion 9b will be fixed in such a manner that its leading end portion for the soldering projects from the board fixing face 7b.

Next, assembly procedure of the above-described load detection apparatus will be explained.

Firstly, as shown in FIG. 3, the elastic member 8 will be fixed to the fixation member 7 by pressing the retaining pieces 8c into the respective elongate holes 7g.

Also, as shown in FIG. 5, the output terminals 9 will be fixed to the fixation member 7 by pressing the fixing shaft portions 9a into the press-in holes 7j and the pressing the connecting shaft portions 9b into the press-in grooves 7k.

Further, the strain detection elements 5 will be soldered to the first connection portion 6a through the first through holes 6d.

Figure 7:
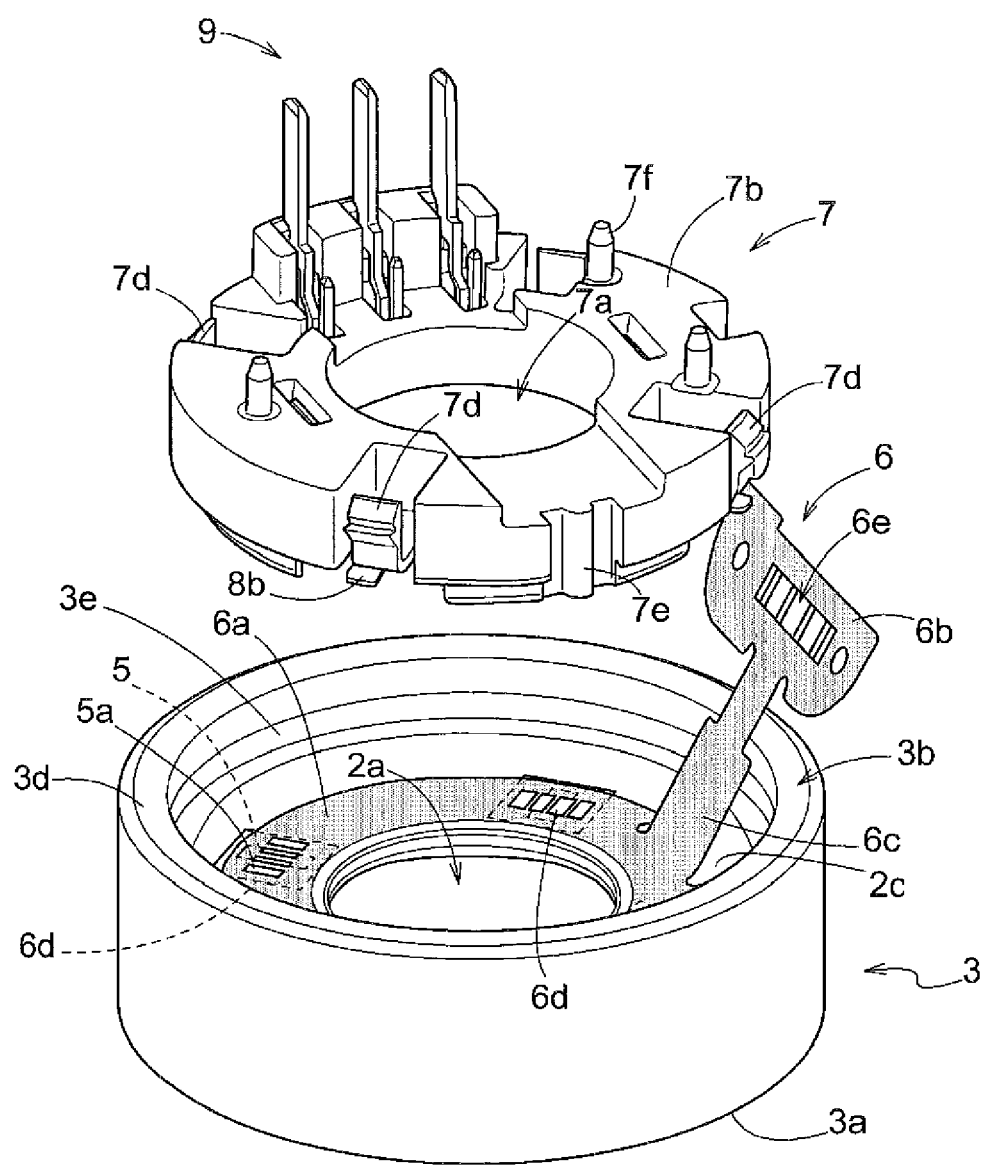
[FIG. 7] is a perspective view illustrating an assembly procedure of the fixation member to a tubular body.

Then, as shown in FIG. 7, the connection member 6 whose third connection portion 6c has been bent along the border with the first connection portion 6a will be assembled to the inner side of the second tubular body portion 3b and the stain detection elements 5 will be fixedly bonded to the stain detection face 2c and also the third connection portion 6c will be retained under a posture along the inner circumferential side of the second tubular body portion 3b.

Next, the fixation member 7 will be pressed to the inside of the second tubular body portion 3b along the tube axis direction, with keeping the elastic member 8 under the posture toward the first connection portion 6a.

With the above, as shown in FIG. 8, the elastic member 8 and the fixation member 7 will be assembled with the second tubular body portion 3b and be supported to the annular brim 3f via the support pieces 8b of the elastic member 8, with the engaging pawls 7d being engaged to the brim 3d and with the third connection portion 6c circumventing the edges of the elastic member 8 and the fixation member 7.

Figure 9:
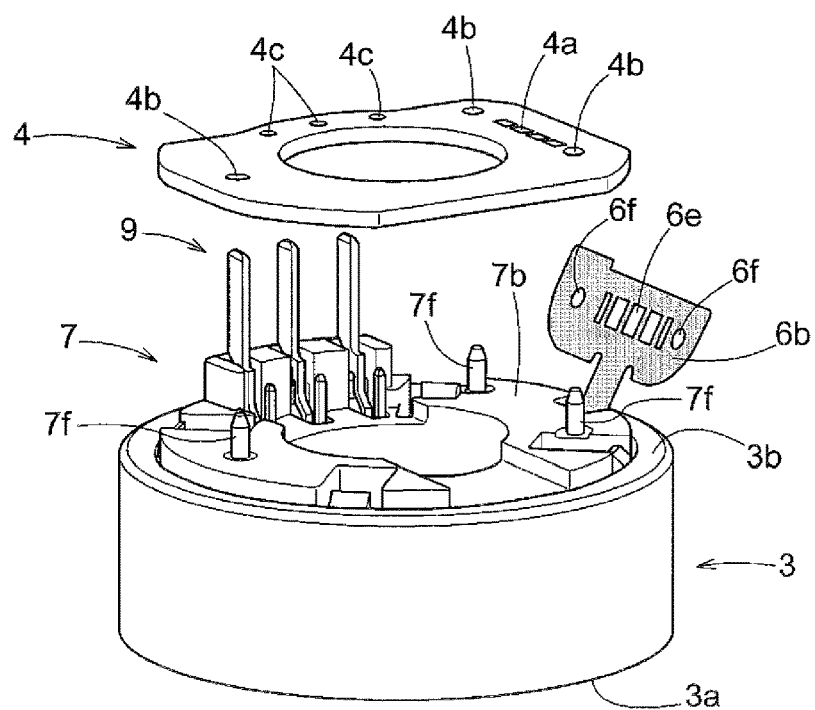
[FIG. 9] is a perspective view for explaining an assembly procedure of a circuit board to the fixation member.
Figure 10:
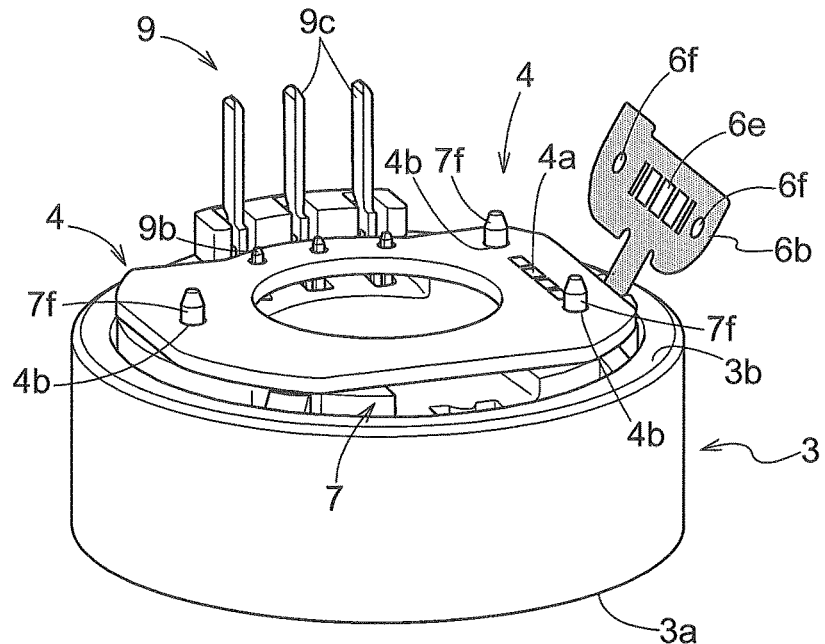
[FIG. 10] is a perspective view for explaining an assembly procedure of the circuit board to the fixation member.

Next, as shown in FIG. 9 and FIG. 10, the circuit board 4 will be mounted under a predetermined posture on the board fixing face 7b.

In the above, the circuit board 4 will be mounted under the predetermined posture by inserting the positioning pins 7f into three positioning holes 4b respectively defined in the circuit board 4 and also inserting the respective leading end portions of the connecting shaft portions 9b of the output terminals 9 into three connecting holes 4c also defined in the circuit board 4.

Figure 11:
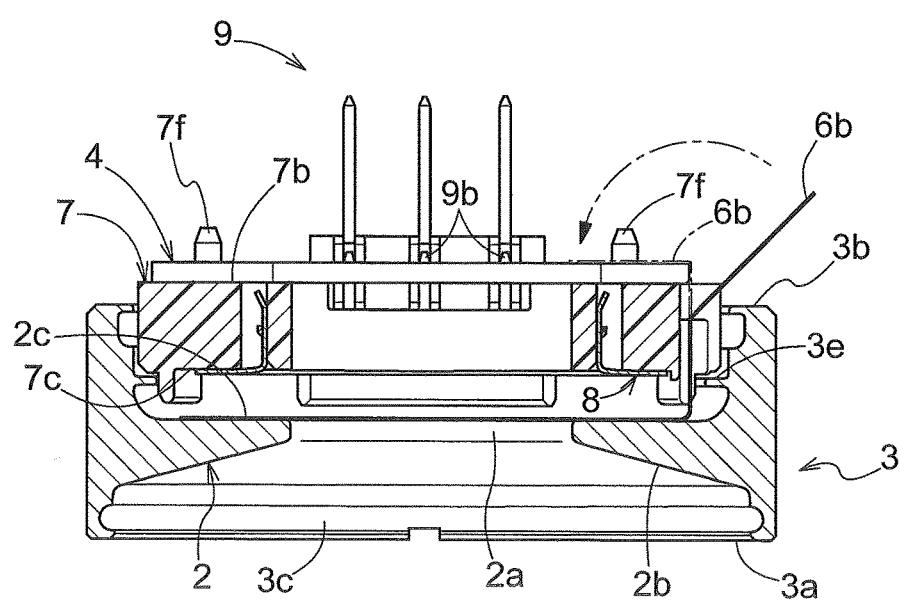
[FIG. 11] is a section view for explaining an assembly procedure of a connection member to the circuit board.
Figure 12:
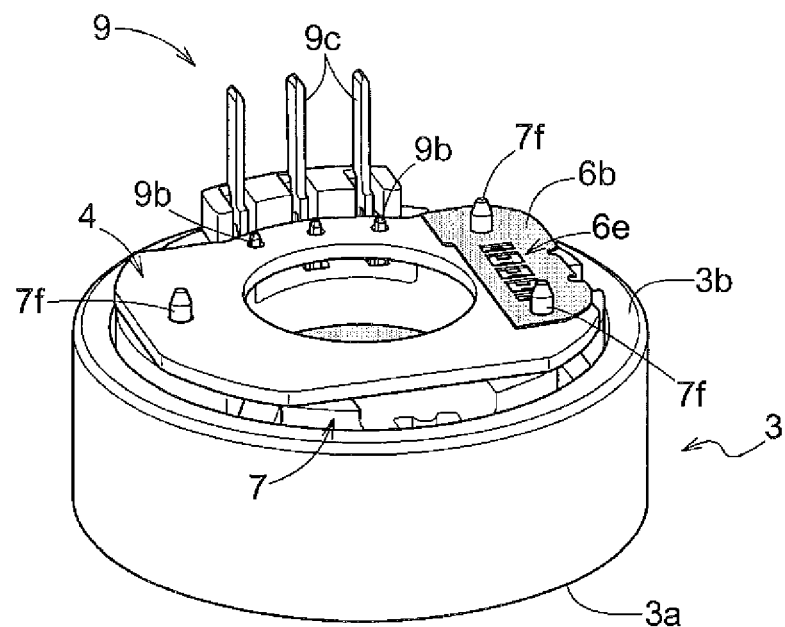
[FIG. 12] is a perspective view for explaining an assembly procedure of the connection member to the circuit board.

Next, as shown in FIG. 11 and FIG. 12, the border between the second connection portion 6b and the third connection portion 6c will be bent and the positioning pins 7f will be inserted into two respective positioning holes 6f defined in the second connection portion 6b.

Figure 13:
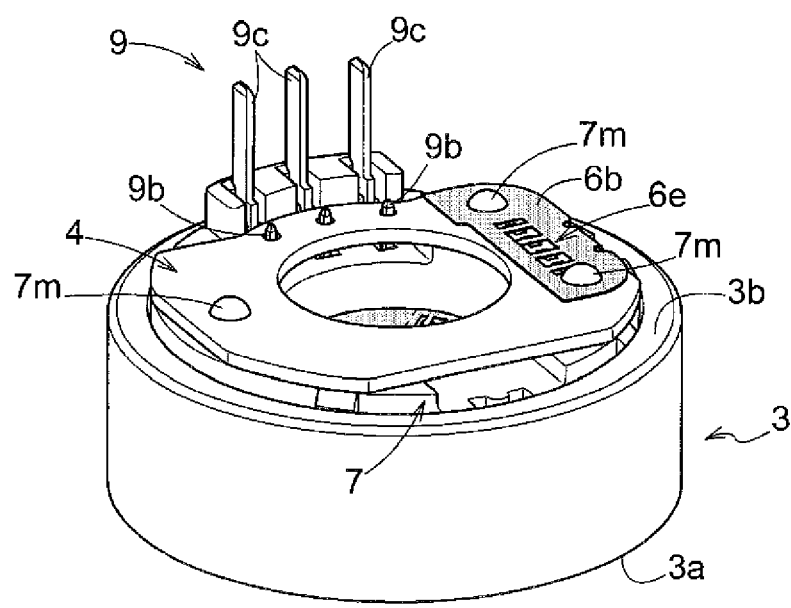
[FIG. 13] is a perspective view showing the circuit board and the connection member which are fixed to the fixation member.

Then, as shown in FIG. 13, one positioning pin 7m (7f) inserted into only the circuit board 4 and two positioning pins 7m (7f) inserted into both the circuit board 4 and the second connection portion 6b will be heat-caulked with infrared beam.

Further, the leading end portions of the connecting shaft portions 9b of the output terminals 9 and the circuit board 4 will be electrically connected to each other by soldering and also the second connection portion 6b and the circuit board 4 will be electrically connected to each other.

Thereafter, as shown in FIG. 1 hereinbefore, the input member 1 will be assembled to the inner side of the first tubular body portion 3a and will be retained thereto by the stopper ring 1b, whereby the assembly of the load detection apparatus will be completed.

Incidentally, after such components or members as the input member 1 and the stopper ring 1b are assembled to the inner side of the first tubular body portion 3a, the remaining components or members can be assembled to the second tubular body portion 3b.

[Other Embodiments]

1. The load detection apparatus relating to the embodiment can include a connection member configured to electrically connect the strain detection element and the circuit board to each other by means of pressing contact thereof along the tube axis direction. With the above-described arrangement, the soldering operation can be omitted so the installment operation of the connection member can be made easier.

2. The load detection apparatus relating to the embodiment can be configured such that a portion of the attaching portion of the circuit board relative to the second connection portion projects through the second connection portion to the side opposite to the circuit board. With this arrangement, when the attaching portion and the second connection portion are to be soldered to each other, uncontrolled spreading of the solder material to the surrounding can be restricted, so that the reliability of the soldering operation can be improved.

3. The load detection apparatus relating to the embodiment can be configured such that the attaching portion of the circuit board relative to the second connection portion is exposed to the outside through an opening defined in the second connection portion.

4. The load detection apparatus relating to the embodiment can be configured such that with omission of the fixation member, the circuit board is opposed directly to the stain detection element.

5. The load detection apparatus relating to the embodiment can be configured such that while the fixation member is still provided between the strain detection element and the circuit board, the attaching portion of the strain detection element relative to the first connection member is directly opposed to the circuit board. With this arrangement, the installment operation of the connection member between the strain detection element and the circuit board can be further facilitated.

INDUSTRIAL APPLICABILITY

The present invention is applicable to a load detection apparatus for detecting not only a pressing force applied to a brake disk for vehicle braking, but also for various kinds of load.

DESCRIPTION OF REFERENCE MARKS/NUMERALS

1: input member
2: strain element
2c: a face of the strain element opposite to its face contacting the input member (strain detecting face)
3: tubular body
3e: reaction-force receiving portion
4: circuit board
4a: signal input portion (attaching portion to a second connection portion)
5: stain detection element
5a: lead portion (attaching portion to a first connection portion)
6: connection member
6a: first connection portion
6b: second connection portion
7: fixation member
8: elastic member
F: load
X: tube axis

The invention claimed is:
1. A load detection apparatus comprising:
an input member for receiving input of a load;
a tubular body having a strain element configured to generate a strain due to the load inputted to the input member;
a strain detection element fixed to a face of the strain element, the face being opposite to another face of the strain element, said another face coming into contact with the input member, the strain detection element being configured to detect the strain generated in the strain element;

a circuit board mounted to oppose the strain detection element in a tube axis direction of the tubular body, the circuit board being configured to receive input of detection information of the strain detection element;

a connection member having a first connection portion to be electrically connected to the strain detection element and a second connection portion to be electrically connected to the circuit board;

an attaching portion of the strain detection element to be attached to the first connection portion being provided to oppose the circuit board;

an attaching portion of the circuit board to be attached to the second connection portion being provided in a face of the circuit board opposite a further face of the circuit board which faces the first connection portion; and a fixation member to which the circuit board is fixed provided between the strain element and the circuit board, wherein the fixation member is supported to the tubular body via an elastic member.

2. The load detection apparatus of claim 1, wherein the connection member is formed of a flexible material and is disposed to circumvent an edge of the circuit board.

3. The load detection apparatus of claim 1, wherein:
the elastic member is disposed between the strain element and the fixation member; and
a reaction-force receiving portion that receives the elastic member is provided in the tubular body.

4. The load detection apparatus of claim 3, wherein the reaction-force receiving portion is provided in a cantilever manner from an inner circumferential portion of the tubular body toward the tube axis.

* * * * *